United States Patent
Iijima et al.

(10) Patent No.: US 11,639,738 B2
(45) Date of Patent: May 2, 2023

(54) BEARING DEVICE AND CONSTRUCTION MACHINE

(71) Applicant: Caterpillar SARL, Geneva (DE)

(72) Inventors: Seiji Iijima, Akashi (JP); Naoki Miyata, Akashi (JP); Kazufumi Nishimoto, Akashi (JP); Yasunori Komatsubara, Akashi (JP); Yuma Yabuki, Tokyo (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 17/266,869

(22) PCT Filed: Aug. 5, 2019

(86) PCT No.: PCT/EP2019/025257
§ 371 (c)(1),
(2) Date: Feb. 8, 2021

(87) PCT Pub. No.: WO2020/030297
PCT Pub. Date: Feb. 13, 2020

(65) Prior Publication Data
US 2021/0293276 A1    Sep. 23, 2021

(30) Foreign Application Priority Data
Aug. 6, 2018    (JP) .............................. JP2018-147894

(51) Int. Cl.
*F16C 33/74*    (2006.01)
*E02F 9/00*    (2006.01)
*F16C 11/04*    (2006.01)

(52) U.S. Cl.
CPC .............. *F16C 33/74* (2013.01); *E02F 9/006* (2013.01); *F16C 11/04* (2013.01)

(58) Field of Classification Search
CPC ........ F16C 11/04; F16C 11/045; F16C 17/02; F16C 17/26; F16C 33/74
See application file for complete search history.

(56) References Cited

U.S. PATENT DOCUMENTS 3,522,977 A * 8/1970 Lee ........................ F16C 9/04
384/322
6,877,259 B2 * 4/2005 Nishimura ............ F16C 11/045
403/324
(Continued)

FOREIGN PATENT DOCUMENTS

JP    S35358402 U    5/1978
JP    S5932768 U    2/1984
(Continued)

OTHER PUBLICATIONS

International Search Report related to Application No. PCT/EP2019/025257; reported dated Oct. 9, 2019.
Japanese Search Report related to Application No. 2018-147894.

*Primary Examiner* — James Pilkington

(57) ABSTRACT

To provide a bearing device which can ensure the sealing performance by using floating seal to eliminate the need of adding lubricant over a long term and a construction machine comprising the bearing device. The bearing device comprises a shaft. The bearing device comprises a boss portion having a bearing rotatably holding the shaft. The bearing device comprises a cylindrical collar mounted on an end part side of the shaft rather than the boss portion. The bearing device comprises a floating seal for sealing lubricant sandwiched between the boss portion and collar. The bearing device comprises a pin being inserted into the insertion holes provided in the shaft and collar and integrally fixing the shaft and collar at a position where a predetermined axial load is applied to the floating seal between the collar and boss (Continued)

portion. The bearing device comprises a bracket having an opening for mounting the collar.

15 Claims, 13 Drawing Sheets

(56) References Cited

U.S. PATENT DOCUMENTS

| | | | | |
|---|---|---|---|---|
| 8,892,157 B2 * | 11/2014 | Wan | ................ | H04B 1/3888 |
| | | | | 330/303 |
| 2004/0060210 A1 | 4/2004 | Nishimura et al. | | |

FOREIGN PATENT DOCUMENTS

| | | | |
|---|---|---|---|
| JP | S6024928 U | | 3/1989 |
| JP | H0410116 U | | 1/1992 |
| JP | H04121519 U | | 10/1992 |
| JP | H06159346 A | | 6/1994 |
| JP | H09151482 A | | 6/1997 |
| JP | H09303384 A | | 11/1997 |
| JP | 2002309619 A | | 10/2002 |
| JP | 2003020678 A | | 1/2003 |
| JP | 2003176815 A | | 6/2003 |
| JP | 2004205004 A | | 7/2004 |
| JP | 2005090620 A | | 4/2005 |
| JP | 2007263237 A | | 10/2007 |
| JP | 2009036294 | * | 2/2009 |

* cited by examiner

BEARING DEVICE AND CONSTRUCTION MACHINE

CROSS-REFERENCE TO RELATED APPLICATION

This Application is a 35 USC § 371 US National Stage filing of international Application No. PCT/EP2019/025257 tiled on Aug. 5, 2019 which claims priority under the Paris Convention to Japanese Patent Application No. 2018-147894 filed on Aug. 6, 2018.

FIELD OF THE INVENTION

The present invention relates to a bearing device having bearings for rotatably holding a shaft body and a construction machine equipped with it.

BACKGROUND ART

A front working machine of the construction machine has multiple shanks and it is required to feed grease periodically for lubricating and protecting the shanks. However, since the grease feeding work takes time, it is desirable to fabricate maintenance-free shanks so that a grease feeding interval and the grease feeding itself can be unnecessary.

As a maintenance-free means, a constitution is known to encapsulate grease in a lubricating part using a floating seal. According to this constitution, for example, one boss portion is fitted and secured into a boss hole of one bracket, the other boss portion is secured in an end part of the shaft body and fitted into a boss hole of the other bracket, the floating seal is attached to seal grooves provided on mutually opposed surfaces of both these boss portions and sleeves, the other boss portion is detachably mounted on the other bracket while initial axial compressive load is applied in order to exhibit a sealing performance of the floating seal (see Patent Document 1, for example).

PRIOR ART DOCUMENTS

Patent Documents

[Patent Literature 1] Japanese Unexamined Utility Model Application Publication S No. 60-24928

SUMMARY OF INVENTION

Problem to be Solved by the Invention

In the constitution above, if the dimensional precision between brackets is not good, intended initial axial compressive load may not be applied. When a dimension between brackets is wider than supposed, for example, even if a mounting screw at the boss portion is tightened as much as possible, a gap cannot be reduced, therefore, enough compressive load cannot be applied to the floating seal, and a sealing property is hardly obtained.

In particular, the front working machine of the construction machine often has a welded structure, so a thermal distortion due to welding makes it difficult to obtain correct finished dimensions for parts. In such a case, a machining process including cutting may be required to ensure correct dimensions of mounting surfaces finally, but this machining may take time and cost.

The present invention, conceived to address the problem above, has an objective to provide the bearing device which can ensure the sealing performance with a seal member and eliminate the need of adding lubricant over a long term and the construction machine with it.

Means for Solving the Problem

The invention may provide a bearing device comprising a shaft body, a cylinder part having a bearing holding the shaft body rotatably, a cylindrical holding member mounted on an end part side of the shaft body rather than the cylinder part, a seal member for sealing lubricant sandwiched between the cylinder part and holding member, a pin being inserted into insertion holes provided in the shaft body and holding member and integrally fixing the holding member and shaft body at a position where a predetermined axial load is applied to the seal member between the holding member and cylinder part, and a mounted part having an opening for mounting the holding member.

The invention may provide the bearing device, wherein the holding members of the bearing device are mounted respectively on both end sides of the shaft body rather than the cylinder part.

The invention may provide the bearing device, wherein in the bearing device, a pair of the cylinder parts are provided and comprise an intermediate cylinder part sandwiched between a pair of the cylinder parts.

The invention may provide the bearing device, wherein in the bearing device, the intermediate cylinder part has an intermediate bearing for rotatably holding the shaft body and comprises an intermediate seal member for sealing lubricant sandwiched between the cylinder part and intermediate cylinder part.

The invention may provide the bearing device, wherein the bearing device comprises an inner seal member for sealing a contact area between the shaft body and holding member.

The invention may provide defined in claim 6 provides the bearing device, wherein the bearing device comprises a fixing means for fixing the holding member on the mounted part.

The invention may provide the bearing device, wherein in the bearing device, the fixing means is mounted on the holding member by retaining the pin.

The invention may provide the bearing device, wherein in the bearing device, a fixed part has a concaved part into which the fixing means is fitted.

The invention may provide the bearing device, wherein in the bearing device, end parts of the cylinder part and holding member both sandwiching the seal member are formed partially overlapping with each other in axial direction of the shaft body.

The invention may provide the bearing device, wherein in the bearing device, the mounted part comprises a reinforced plate around the opening.

Favorable Effects of the Invention

According to the invention, since the holding member and shaft body are integrally fixed at the position where the predetermined axial load is applied to the seal member between the holding member and cylinder part by inserting a pin into holes provided in the shaft body and holding member, and the dimension for sandwiching the seal member in axial direction can be fixed with the dimensions of the shaft body and holding member where the dimensional precision can be easily obtained, the sealing performance can be ensured with the seal member, a space having the bearing in the cylinder part is sealed, and the need of adding lubricant to the bearing is eliminated over a long term.

According to the invention, by mounting the holding members respectively on both end sides of the shaft body rather than the cylinder part, the seal member can be sandwiched respectively in axial direction by the holding member and cylindrical body at each position of both ends of the shaft body.

According to the invention, by sandwiching the intermediate cylinder part between a pair of cylinder parts, a lubricant can be sealed more surely even at an opposite side of the holding member of each cylinder part.

According to the invention, by sandwiching the intermediate seal member between the cylinder part and the intermediate cylinder part and by integrally fixing each holding member and the shaft body by using the pin, an axial load can also be applied to the intermediate seal member, a sealing performance can be ensured with the intermediate seal member in a space having an intermediate bearing in the intermediate cylinder part, and the need of feeding lubricant to the intermediate bearing is also eliminated over a long term.

According to the invention, by sealing the contact area between the shaft body and holding member with the inner seal member, the inside of the cylinder part can be sealed and the lubricant filled in the space having the bearing can be more surely sealed.

According to the invention, by fixing the holding member on the mounted part with the fixing means, the shaft body and holding member can be prevented from falling from the opening of the mounted part.

According to the invention, by mounting the fixing means on the holding member by retaining the pin and by using the fixing means to fix the holding member on the mounted part, the pin can be prevented from falling from the insertion holes with a simple configuration.

According to the invention, the concaved part into which the fixing means is fitted is formed on the fixed part so that an intrusion of earth and sand, etc. into the shaft body side and a collision of a stone, etc. with the shaft body can be suppressed.

According to the invention, by forming end parts of the cylinder part and holding member both sandwiching the seal member so as to partially overlap with each other in axial direction of the shaft body, it can be made hard to bite earth and sand, etc. between the cylinder part and holding member.

According to the invention, by installing the reinforced plate around the opening on the mounted part, a strength of the mounted part can be increased and the axial load applied to the shaft body can be surely supported by the mounted part through the holding member.

According to the invention, an easy-to-maintain construction machine can be provided inexpensively by installing the bearing device in accordance with the present disclosure.

DETAILED DESCRIPTION OF THE INVENTION

Below, the invention will be described in detail based on the first embodiment of this invention shown in FIGS. 1 to 4, the second embodiment shown in FIGS. 5 to 7, the third embodiment shown in FIGS. 8 to 10, and the fourth embodiment shown in FIGS. 11 to 13.

To begin with, an explanation will be given to the first embodiment shown in FIGS. 1 to 4.

Figure 4:
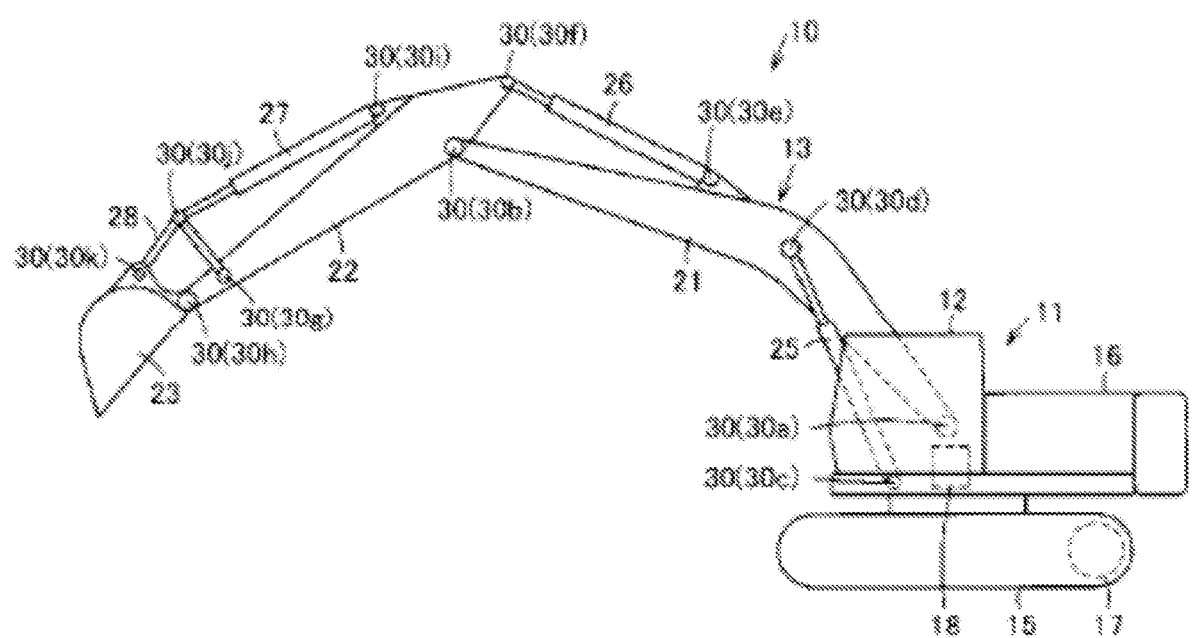
FIG. 4 is a side view illustrating a construction machine comprising the bearing device shown above.

FIG. 4 illustrates a construction machine 10 of hydraulic excavator type. This construction machine 10 comprises a body 11, a cab 12, and a work device 13, the front working machine.

The body 11 comprises a lower traveling body 15 and an upper swiveling body 16 swivelably mounted on the lower traveling body 15. The body 11 comprises a traveling motor 17 driving the lower traveling body 15. The body 11 also comprises a traveling motor 18 driving the upper swiveling body 16.

The cab 12 and work device 13 each are mounted on the body 11 (upper swiveling body 16) respectively. The work device 13 comprises a boom 21 as a first coupled body, an arm 22 as a stick as a second coupled body, and a bucket 23 as a third coupled body respectively. Also, the work device 13 comprises a boom cylinder 25 as a fourth coupled body, an arm cylinder 26 as a stick cylinder as a fifth coupled body, and a bucket cylinder 27 as a sixth coupled body.

The boom 21 is supported at the upper swiveling body 16, and a base end is rotatable vertically. The arm 22 is supported rotatably by a tip of the boom 21. The bucket 23 is rotatably supported through a linkage 28 as a seventh coupled body at a tip of the arm 22. Then, the boom 21 is rotated by the boom cylinder 25, the arm 22 is rotated by the arm cylinder 26, and the bucket 23 is rotated by the bucket cylinder 27. That is to say, in the work device 13 according to the present embodiment, bearing devices 30 are used at multiple positions. In this embodiment, the bearing devices 30a to 30k are used, for example, at a coupling part between a base end of the boom 21 and the upper swiveling body 16, at a coupling part between a tip of the boom 21 and a base end side of the arm 22, at a coupling part between a base end side of the boom cylinder 25 and the upper swiveling body 16, at a coupling part between a tip side of the boom cylinder 25 and the boom 21, at a coupling part between a base end side of the arm cylinder 26 and the boom 21, at a coupling part between a tip side of the arm cylinder 26 and a base end side of the arm 22, at a coupling part between a tip side of the arm 22 and the linkage 28, at a coupling part between a tip side of the arm 22 and the bucket 23, at a coupling part between a base end side of the bucket cylinder 27 and the arm 22, at a coupling part between a tip side of the bucket cylinder 27 and the linkage 28, and at a coupling part between the linkage 28 and the bucket 23. Below, an explanation will be provided on the bearing device 30 of this embodiment by referring to a bearing device 30a as an example, but the explanation is also applicable to other bearing devices 30b to 30k.

Figure 1:
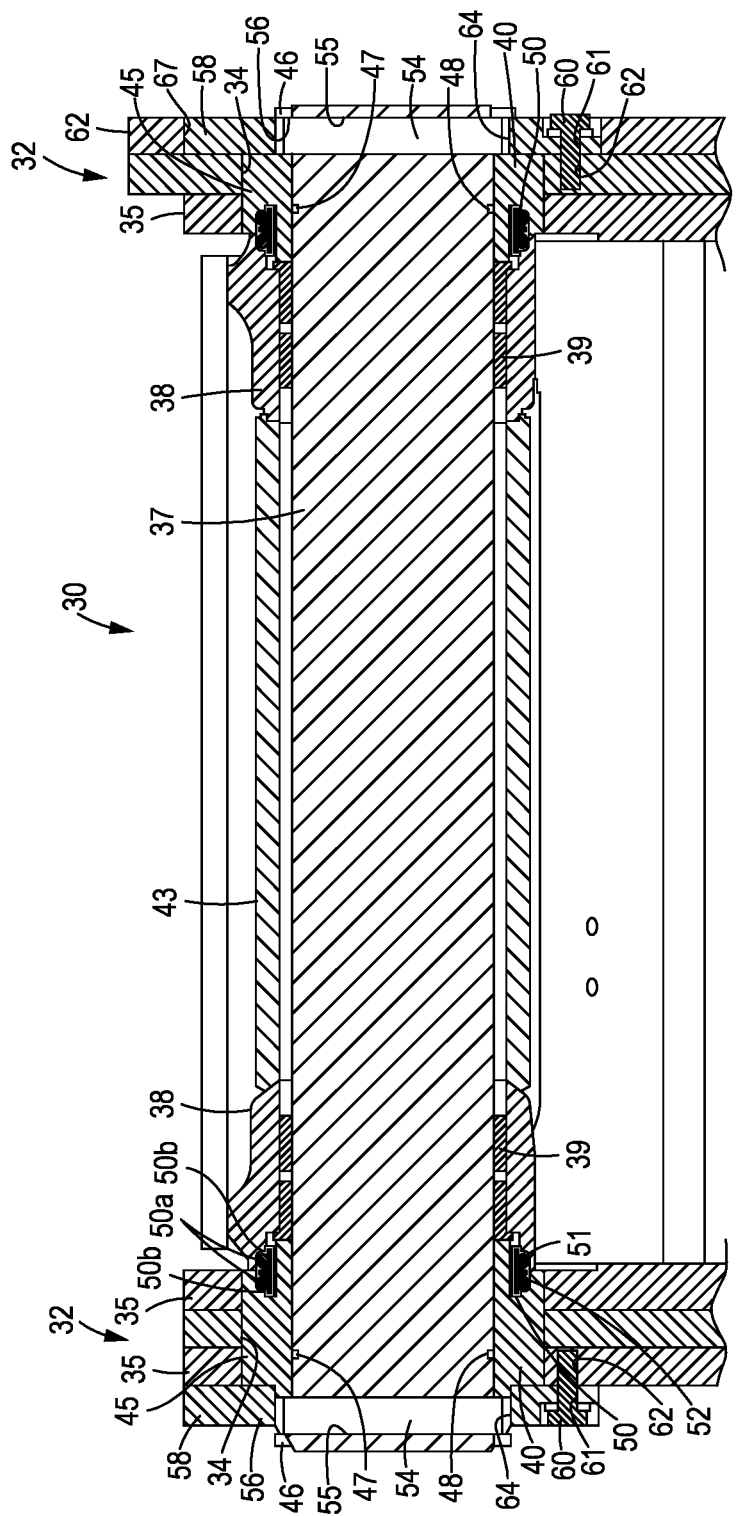
FIG. 1 is a sectional view illustrating a first embodiment of the bearing device according to the present invention.
Figure 2A:
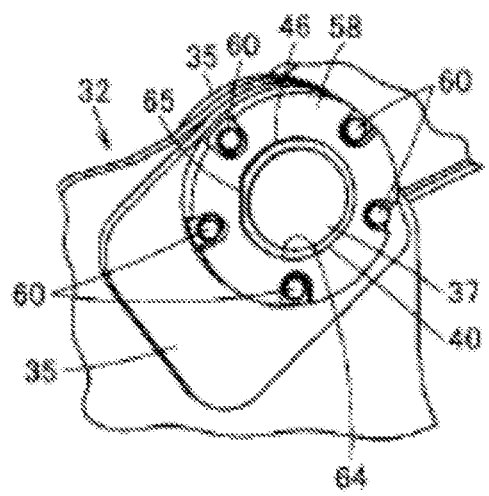
FIG. 2A is a perspective view illustrating one end side of the bearing device shown above and FIG. 2B is a perspective view illustrating the other end side of the bearing device shown above.
Figure 2B:
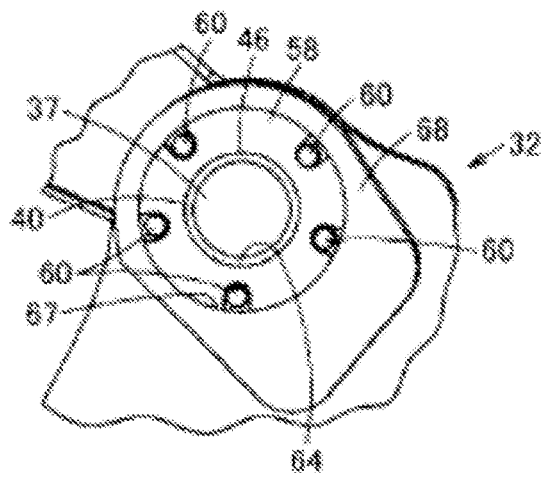
Figure 3:
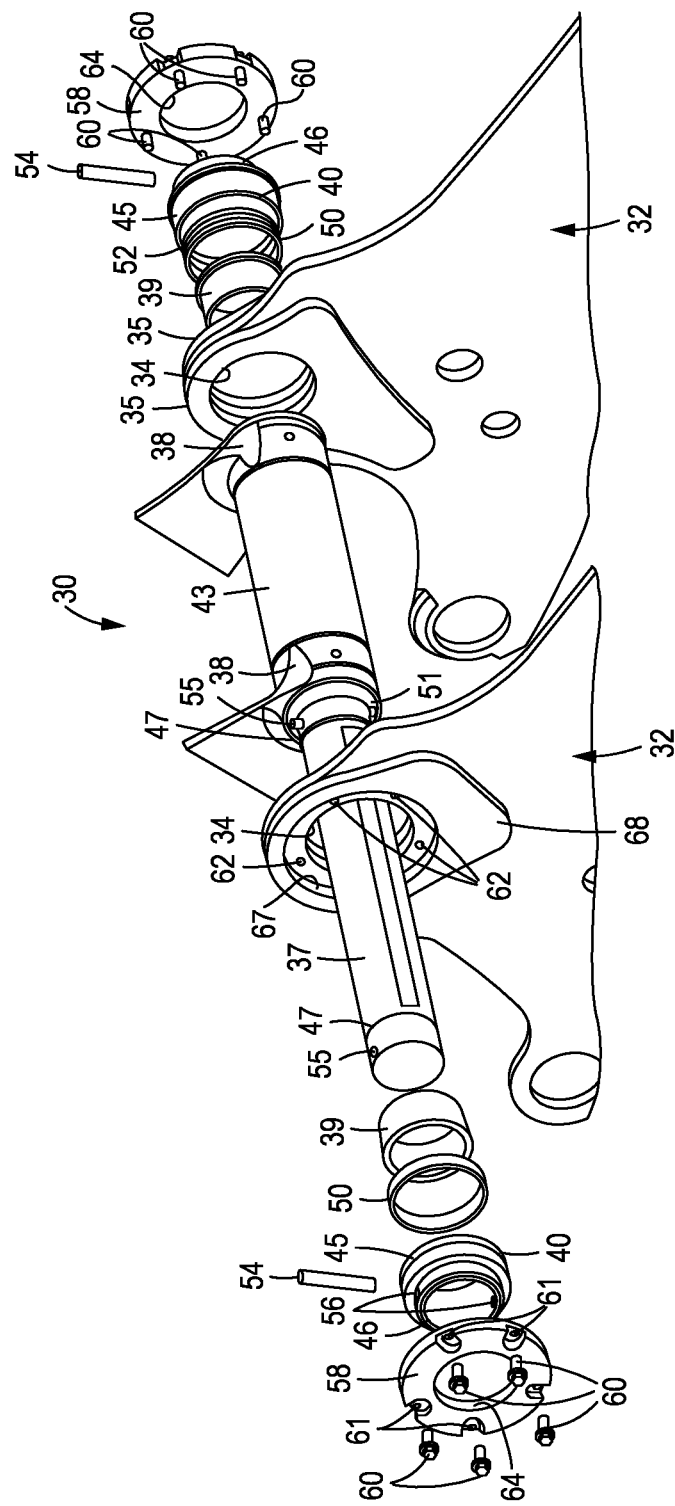
FIG. 3 is a disassembled perspective view illustrating the bearing device shown above.

The bearing device 30 is for the construction machine 10, and according to this embodiment, it is for the work device 13 of the construction machine 10. As shown in FIGS. 1 and 3, the bearing device 30 comprises brackets 32, 32, a pair of mounted parts. The brackets 32, 32 are, for example, formed from steel plate, etc., and are positioned horizontally apart from each other in the vehicle width direction of the construction machine 10 (FIG. 4). Each bracket 32 is, in a case of the bearing device 30a, integrally formed at each upper frame of the upper swiveling body 16 as a receive part. Also, an opening 34 is formed on each bracket 32. Each opening 34 is, for example, formed in a circular shape by penetrating the bracket 32 in a horizontal direction as a thickness direction. Furthermore, a doubling plate 35 as a reinforced plate can be mounted at least on either of brackets 32 through welding, etc. The doubling plate 35 is to reinforce the periphery of the opening 34. For example, the doubling plate 35 may be mounted on one surface or both surfaces of the bracket 32.

Also, the bearing device 30 comprises a shaft 37 as the shaft body, and this shaft 37 is rotatably held through the bearings 39, 39 provided in boss portions 38, 38 as the cylinder parts and is integrally fixed on the collars 40, 40 as the holding members.

The shaft 37 is to be arranged horizontally between brackets 32 and 32. The shaft 37 according to this embodiment is cylindrically formed. That is, the shaft 37 is formed with approximately constant diameter. Also, in this embodiment, the shaft 37 is formed longer than distance between the brackets 32 and 32, and both left and right end parts are inserted into the opening 34 so that they are arranged to be protruded outside from the brackets 32, 32.

In this embodiment, the boss portions 38, 38 are spaced away from each other in axial direction of the shaft 37. These boss portions 38, 38 are situated between the brackets 32 and 32, and are arranged coaxially with the opening 34. In the case of the bearing device 30a, each boss portion 38 is integrally formed respectively at the base end of the boom 21. Also, a sleeve 43 as an intermediate cylinder part is sandwiched between the boss portions 38, 38. The sleeve 43 is formed cylindrically with approximately same diameter dimension as each boss portion 38 and is arranged coaxially with each boss portion 38. Also, the sleeve 43 couples the end parts of the boss portions 38, 38, which are horizontally center side and opposite to the collars 40, 40.

Each bearing 39 is interpolated into the boss portion 38 and is arranged coaxially with the boss portion 38. Each bearing 39 is fitted into and integrally fixed on the boss portion 38, but for example, a stopper such as a spline and key can be provided so that the bearing 39 cannot be idly rotated against the boss portion 38. Also, an axial movement of each bearing 39 can be restricted against the boss portion 38 by using a retainer including a snap ring, for example. Each bearing 39 is lubricated with lubricant oil.

The collars 40, 40 are fixed by both end parts of the shaft 37, one part of the collars is situated inside the opening 34, and remaining other part is protruded outside from both brackets 32, 32. Each collar 40 is cylindrically formed. Each collar 40 according to this embodiment generally comprises a collar body portion 45 as holding member body portion and a fixed part 46 axially protruded from the collar body portion 45. The collar body portion 45 is cylindrically formed and fitted into the opening 34. The fixed part 46 is cylindrically and coaxially formed with the collar body portion 45 and extends from the collar body portion 45 to an end part of the shaft 37 opposite to the boss portion 38 side to protrude outward of the bracket 32.

An area between each collar 40 and shaft 37 is sealed respectively by an O-ring 47 as an inner seal member. The O-ring 47 according to this embodiment is held by the mounting concaved portion 48 formed circumferentially on outer peripheral surface of the shaft 37 and is pressure-contacted with inner peripheral surface of the collar body portion 45 of the collar 40.

Furthermore, a floating seal 50 as a seal member is sandwiched between each collar 40 and each boss portion 38 and a gap between the collar 40 and boss portion 38 is blocked by the floating seal 50. The floating seal 50 is to prevent oil put in the bearing 39 from leaking. The floating seal 50 comprises a pair of metal seal rings 50a, for example, as metallic holding rings and a pair of O-rings 50b, for example, as resin rings held on outer peripheral side of this metal seal ring 50a, and the metal seal rings 50a, 50a come into slide-contact with each other and are rotatable in circumferential direction. Then, with respect to this floating seal 50, one end side (inner) is held by a mounting groove part 51 formed around the bearing 39 at an end part of the collar 40 side of the boss portion 38, and the other end side (outer) is held by a holding groove part 52 formed at an end part of the boss portion 38 side of the collar 40. In this embodiment, the holding groove part 52 is formed on the collar body portion 45 of each collar 40.

Then, each collar 40 is integrally fixed respectively on the shaft 37 with a pin 54. The pin 54 is referred to as a dowel pin and is inserted axially perpendicularly (radially) into insertion holes 55, 56 provided in the shaft 37 and each collar 40. The insertion hole 55 according to this embodiment is formed by penetrating into the shaft 37 in an axially perpendicular direction near both end parts of the shaft 37. A distance between the insertion holes 55 and 55 formed in the shaft 37 is set so that a predetermined axial load (initial axial compressive load) is applied to the floating seal 50 between each collar 40 and each boss portion 38. This predetermined axial load is preset according to the floating seal 50 so that the floating seal 50 can exert a predetermined sealing performance by pressure-contacting a pair of metal seal ring 50a of the floating seal 50 in axial direction. Also, the insertion hole 56 is formed on the fixed part 46 of the collar 40.

Also, the shaft 37 is fixed on the brackets 32, 32 by the flanges 58, 58 as fixing means. Each flange 58 fixes the shaft 37 integrally fixed on each collar 40 to the brackets 32, 32 by fixing each collar 40 to each bracket 32. Each flange 58 according this embodiment is fixed on the bracket 32 by mounting screws 60 for mounting a bolt as a mounting member. That is to say, multiple through holes 61, for example, are formed for inserting the mounting screws 60 in each flange 58, and the mounting screws 60 inserted into the through holes 61 are screwed into screw holes 62, for example, as multiple mounting holes formed in each bracket 32 so that each flange 58 is fixed to each bracket 32 in axial direction of the shaft 37. Also, each flange 58 is mounted on each bracket 32 by retaining each pin 54. That is to say, fitting holes 64 into which the collars 40 are fitted are formed circularly in a central part of each flange 58. The fitting holes 64 are formed circularly, for example, a circumference of the fixed part 46 is covered with the flange 58 by fitting the fixed part 46 of collars 40 into these fitting holes 64 so that the pin 54 can be prevented from being pulled out from the insertion holes 55. Therefore, each flange 58 contacts an outer end part of each collar 40 which is opposite to the boss portion 38 or floating seal 50. That is to say, each flange 58 contacts the collar body portion 45 of each collar 40 in axial direction so that the axial load can be received from each collar 40. Also, with respect to each flange 58 according to this embodiment, an outside, that is, opposite surface to the boss portion 38, is roughly flush with the end part of the collar 40 and shaft 37, for example.

Additionally, a restriction part 65 is formed on at least either of the collar 40 and flange 58 for preventing idling of one against the other. The restriction part 65 according to this embodiment is formed linearly to a part of both the fitting hole 64 of one side flange 58 (FIG. 2(a)) and the collar body portion 45 of the collar 40 fitting into this fitting hole 64. Also, at least either of the flanges 58, the other side flange 58 (FIG. 2(b)) according to this embodiment, is fitted into a concaved part 67 formed on the bracket 32. The concaved part 67 according to this embodiment is formed by circularly cutting off a mounting plate 68 provided on the bracket 32, but the concaved part 67 may be formed on the bracket 32 itself. The flange 58 fitted into the concaved part 67 according to this embodiment is flush with the bracket 32 (mounting plate 68), for example. The mounting plate 68 may be a reinforced plate (doubling plate) for reinforcing the bracket 32.

Next, an explanation will be provided on the embodiments shown.

When assembling the bearing device 30, first form the insertion holes 55, 55 in advance at correct positions of the shaft 37 so that the predetermined axial load can be applied to the floating seal 50, and insert this shaft 37 into the bearing 39 and sleeve 43 on the boss portion 38 arranged between the brackets 32 and 32. Mount the floating seal 50 on the mounting groove part 51 at outer end part of the boss portion 38. Also, lubricate the bearing 39 with lubricant oil.

Next, mount the O-rings 47, 47 on the mounting concaved portions 48, 48 of the shaft 37, and mount the collars 40 on both end parts of the shaft 37. Fit the collar body portion 45 of each collar 40 into the opening 34 of each bracket 32, align the insertion hole 56 located at the fixed part 46 protruding outside from each bracket 32 with the insertion hole 55 of the shaft 37, insert the pin 54 into the insertion holes 55 and 56 to integrally fix each collar 40 with the shaft 37. That is to say, each floating seal 50 is held by the holding groove part 52 of each collar 40 and sandwiched between the boss portion 38 and each collar 40 so that each collar 40 is positioned in axial direction of the shaft 37 at a position where the predetermined axial load is applied to each floating seal 50.

Then, mount the flange 58 respectively on each collar 40 from outside of each bracket 32, and fix each flange 58 on each bracket 32 with mounting screw 60.

As a result, with respect to the bearing device 30, the shaft 37 and the collars 40, 40 are integrally fixed by the pins 54, 54, and these integrally fixed shaft 37 and collars 40, 40 are integrally fixed on the brackets 32, 32 by the flanges 58, 58. Therefore, the boss portions 38, 38 rotatably holding the shaft 37 with the bearings 39, 39 and the sleeve 43 coupling these boss portions 38, 38 become relatively rotatable against the shaft 37, collars 40, 40, and brackets 32, 32. During this rotation, with respect to the floating seal 50, since one metal seal ring 50a and O-ring 50b are held by the collars 40, 40 and the other metal seal ring 50a and O-ring 50b are held by the boss portions 38, 38, the metal seal rings 50a, 50a being pressure-contacted with each other by the axial load slide-contact with each other, one metal seal ring 50a rotates relatively to the other metal seal ring 50a so that the sealing performance of a space having the bearings 39, 39 is kept.

As explained above, according to this embodiment, since the collar 40 and shaft 37 are integrally fixed at a position where the predetermined axial load is applied to the floating seal 50 between the collar 40 and boss portion 38 by inserting pin 54 into the insertion holes 55, 56 provided in the shaft 37 and collar 40, a dimension for sandwiching the floating seal 50 in axial direction can be fixed with dimensions of the shaft 37 and collar 40 where a machining is relatively easy and dimensional precision can be easily obtained. Therefore, the floating seal 50 sandwiched by the shaft 37 and collar 40 are prevented from being opened to ensure the sealing performance with the floating seal 50, and the space having the bearing 39 in the boss portion 38 is sealed by the floating seal 50 so that a maintenance-free condition can be kept over a long term which makes it unnecessary to additionally feed lubricant oil to the bearing 39.

Especially, as the work device 13 of the construction machine 10 often has a welded structure and the thermal distortion due to welding makes it difficult to obtain correct finished dimensions for parts, although the distance between the brackets 32 and 32 may vary, the sealing property through the floating seal 50 cannot be damaged, as described above, by setting the dimension sandwiching the floating seal 50 by only the positions of the insertion holes 55, 56 of the shaft 37 and collar 40 having good dimensional precision without depending on the dimensions of brackets 32 being subject to vary, even if the distance between the brackets 32 and 32 may vary a little.

Also, by mounting a pair of collars 40 respectively on both end sides of the shaft 37 rather than the boss portion 38, the floating seal 50 can be sandwiched in axial direction by the collar 40 and boss portion 38 respectively at both ends of the shaft 37.

Furthermore, by sandwiching the sleeve 43 between a pair of boss portions 38 and 38, the space having the bearing 39 of each boss portion 38 are coupled with each other through the sleeve 43, and lubricant oil can be surely sealed at opposite side of the collar 40 of each boss portion 38.

Also, mount the flange 58 respectively on each collar 40 from outside of each bracket 32, and fix these flange 58 on each bracket 32 with mounting screws 60. In this manner, by fixing at least either of collars 40 to the bracket 32 with the flange 58, the shaft 37 and collar 40 can be prevented from falling from the opening 34 of the bracket 32.

Furthermore, by sealing a contact area between the shaft 37 and each collar 40 with the O-ring 47, an inside of the boss portion 38 can be sealed and the lubricant oil filled in the space having the bearing 39 can be surely sealed.

Also, by installing the doubling plate 35 around the opening 34 of the bracket 32, a strength of the bracket 32 can be increased and the axial load applied to the shaft 37 can be surely supported by the bracket 32 through the collar 40.

Furthermore, since the flange 58 is mounted on the collar 40 and the pin 54 is retained, so as to cover the fixed part 46 of the collar 40, the pin 54 can be prevented from falling from the insertion holes 55, 56 with a simple configuration by effectively utilizing the flange 58 fixing the collar 40 to the bracket 32.

Furthermore, since the flange 58 is fitted into the fixed part 46 of the collar 40 and pressed from the end part side of the collar body portion 45 as a large diameter to be fixed on the bracket 32, when an axial (thrust) load occurs on the shaft 37, the flange 58 can receive this load so that the axial load applied to the shaft 37 can be surely supported.

Also, by forming the concaved part 67 into which the flange 58 is fitted on the bracket 32, a protrusion can be reduced from the bracket 32 at an end part of the flange 58 and shaft 37, etc., an intrusion of earth and sand, etc. into the shaft 37 side and a collision of a stone, etc. with the shaft 37 can be suppressed, and an excellent design can be provided.

Then, an easy-to-maintain construction machine 10 can be provided inexpensively by installing the bearing device 30 mentioned above.

Next, an explanation will be given to the second embodiment shown in FIGS. 5 to 7. Note that the explanation will be simplified by giving the same signs to same parts of the embodiment as those shown in FIGS. 1 to 4.

Figure 5:
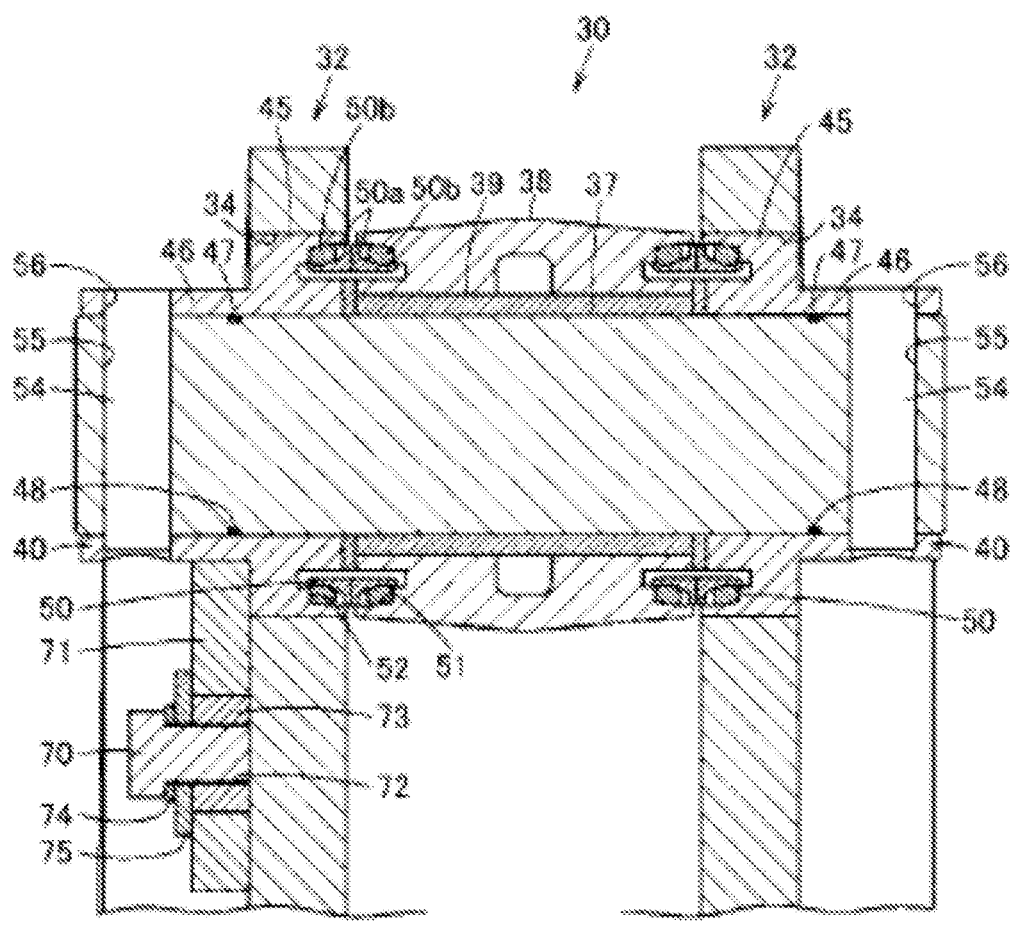
FIG. 5 is a sectional view illustrating a second embodiment of the bearing device according to the present invention.
Figure 6A:
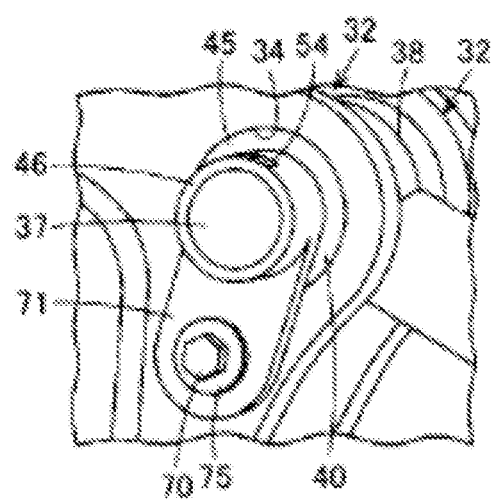
FIG. 6A is a perspective view illustrating one end side of the bearing device shown above and FIG. 6B is a perspective view illustrating the other end side of the bearing device shown above.
Figure 6B:
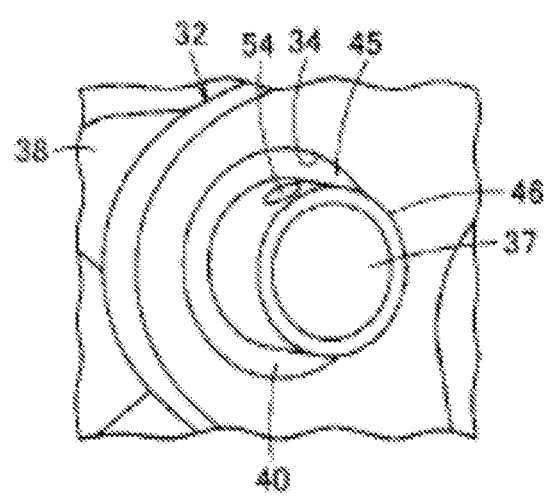
Figure 7:
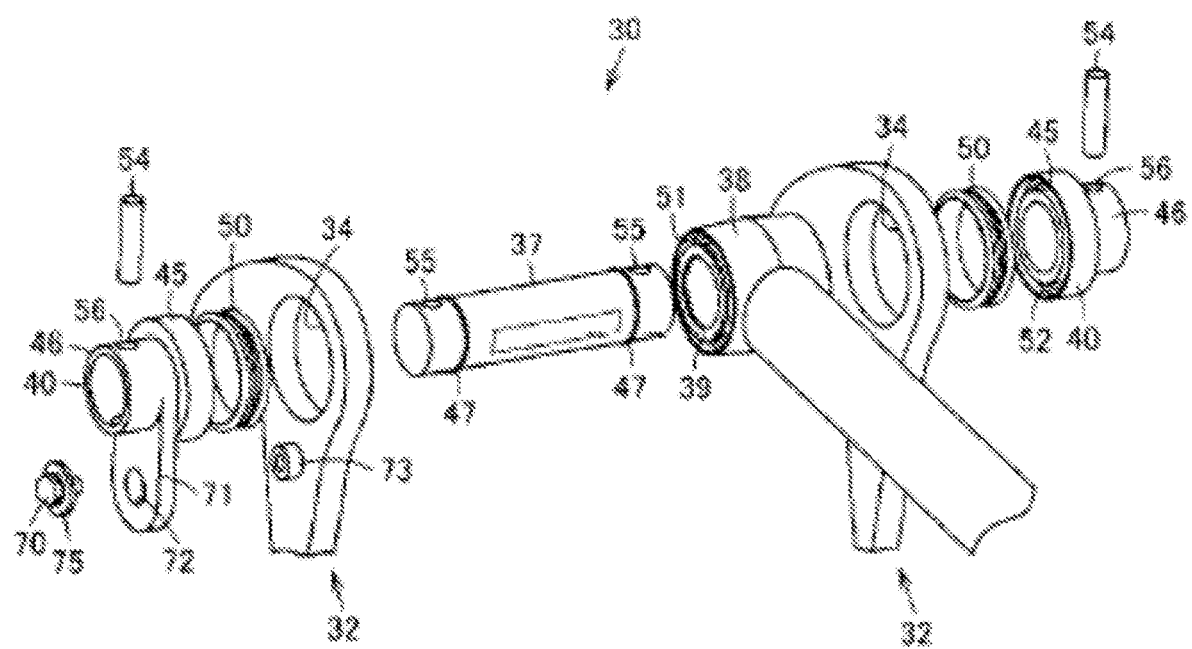
FIG. 7 is a disassembled perspective view illustrating the bearing device shown above.

With regard to the bearing device 30 in the embodiment shown in FIGS. 5 to 7, an explanation will be provided based on a bearing device 30f as an example, the explanation is also applicable to other bearing devices 30a to 30e, 30g to 30k.

As shown in FIGS. 5 and 7, the bearing device 30 comprises a boss portion 38 and bearing 39 between the brackets 32 and 32. The bearing 39 is arranged around both ends of the boss portion 38. Each bracket 32 is, in a case of the bearing device 30f, integrally formed respectively at the base end of the arm 22. Also, the boss portion 38 is, in the case of the bearing device 30f, integrally formed at a tip of a cylinder rod of the arm cylinder 26.

The floating seal 50 is located sandwiched between both end parts of the boss portion 38 and the collar 40.

Also, with respect to each collar 40, the collar body portion 45 is fitted into the opening 34 of each bracket 32, and the fixed part 46 is protruded outside from each bracket 32. Furthermore, at least either of collars 40, one side collar 40 according to this embodiment, is integrally fixed on the bracket 32 directly by a bolt 70 as a fixing means (FIG. 6(a)), the other side collar 40 is not fixed on the bracket 32 (FIG. 6(b)). According to this embodiment, on the collar 40, an extending part 71 is formed extending radially from the fixed part 46, and a through hole 72 is formed penetrating this extending part 71. Also, a boss 73 as a mounting hole to be fitted into the through hole 72 is protrusively provided in the bracket 32, the bolt 70 is fixed on this boss 73 through a spring washer 74 and washer 75 as a spacer so that the collar 40 is fixed to the bracket 32.

Then, with respect to the bearing device 30, the shaft 37 and the collars 40, 40 are integrally fixed by the pins 54, 54, and these integrally fixed shaft 37 and collars 40, 40 are integrally fixed on the brackets 32, 32 by the bolt 70. Therefore, the boss portion 38 rotatably holding the shaft 37 with the bearing 39 becomes relatively rotatable against the shaft 37, collars 40, 40, and brackets 32, 32. Here, the floating seal 50 keeps the sealing performance in the space having the bearings 39, 39 while one metal seal ring 50a slide-contacts with and relatively rotates against the other metal seal ring 50a.

According to this embodiment, by fixing at least either of collars 40 to the bracket 32 with the bolt 70, the shaft 37 and collar 40 can be prevented from falling from the opening 34 of the bracket 32.

Next, an explanation will be given to the third embodiment shown in FIGS. 8 to 10. Note that the explanation will be simplified by giving the same signs to same parts of the embodiment as those mentioned above.

Figure 8:
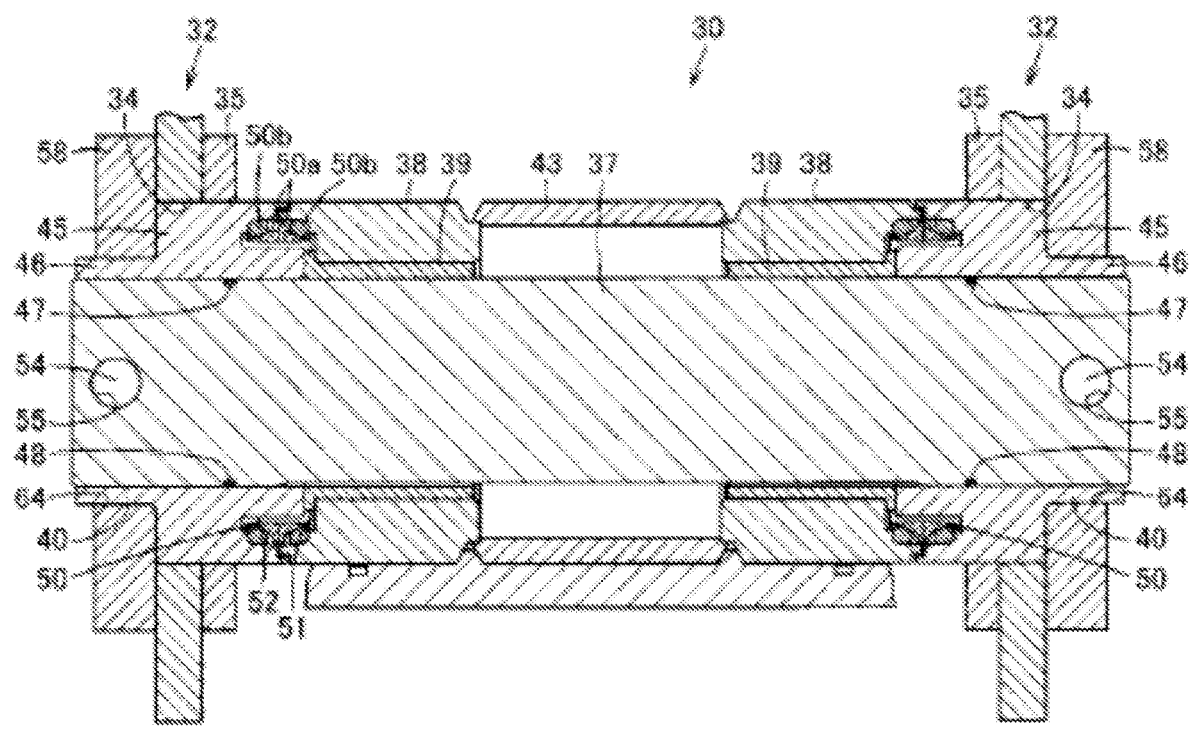
FIG. 8 is a sectional view illustrating a third embodiment of the bearing device according to the present invention.
Figure 9:
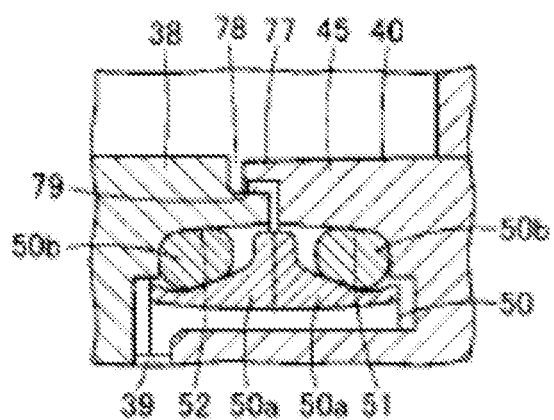
FIG. 9 is a sectional view illustrating enlarged portion of the cylinder part and holding member opposing to each other in the bearing device shown above.
Figure 10:
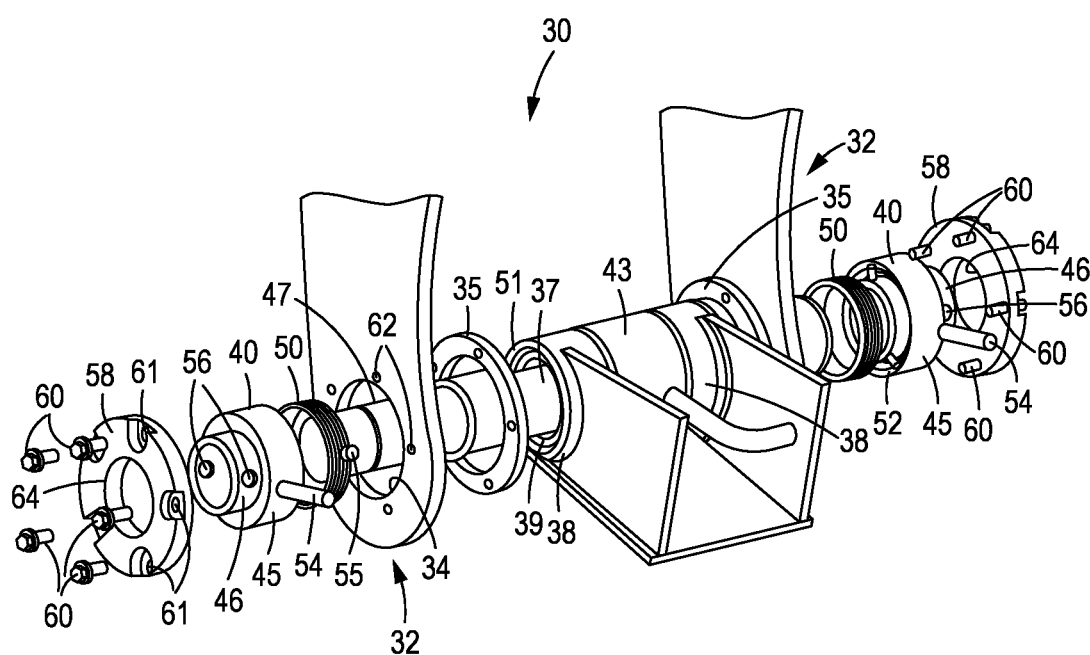
FIG. 10 is a disassembled perspective view illustrating the bearing device shown above.

With regard to the bearing device 30 in the embodiment shown in FIGS. 8 to 10, an explanation will be provided based on a bearing device 30h as an example, the explanation is also applicable to other bearing devices 30a to 30g, 30i to 30k.

As shown in FIGS. 8 and 10, with respect to the bearing device 30, a doubling plate 35 is provided respectively on each bracket 32. Each bracket 32 is, in a case of the bearing device 30h, integrally formed respectively at the bucket 23. For example, the doubling plate 35 is mounted on one surface, for example, inner surface of each bracket 32. Also, the bearing device 30 comprises a pair of boss portions 38, 38 and bearings 39, 39. Each boss portion 38 is, in the case of the bearing device 30h, integrally formed respectively at the tip of the arm 22.

Also, with respect to the bearing device 30, as shown in the FIG. 9, the end parts of each boss portion 38 and each collar 40 both sandwiching the floating seal 50 are formed partially overlapping with each other in axial direction of the shaft 37. In other words, at an opposing position of the boss portion 38 and collar 40, a protrusion part 77 is formed extending from one of the boss portion 38 and collar 40 to the other and protruding along axial direction of the shaft 37, and a receive concave part 78 is formed receiving the protrusion part 77 on the other of the boss portion 38 and collar 40. In this embodiment, the protrusion part 77 is protrusively provided from the periphery of the mounting groove part 51 of the boss portion 38 toward the collar 40, and the receive concave part 78 is recessed around the holding groove part 52 of each collar 40, but the protrusion part 77 may be protrusively provided from the periphery of the holding groove part 52 of the collar 40 toward the boss portion 38 and the receive concave part 78 may be recessed around the mounting groove part 51 of the boss portion 38. Therefore, in this embodiment, between the protrusion part 77 and receive concave part 78, a labyrinth route 79 communicated with the mounting groove part 51 and holding groove part 52 is formed in a zigzag manner in axial direction of the shaft 37.

In this manner, by forming the end parts of each boss portion 38 and collar 40 both sandwiching the floating seal 50 so as to partially overlap with each other in axial direction of the shaft 37, it can be made hard to bite earth and sand, etc. between the boss portion 38 and collar 40. Therefore, entering of earth and sand, etc. into an inside of the bearing 39 can be effectively prevented.

Note that the labyrinth route 79 according to this embodiment is applicable to each end part of the boss portion 38 and collar 40 sandwiching the floating seal 50 in each embodiment mentioned above.

Next, an explanation will be given to the fourth embodiment shown in FIGS. 11 to 13. Note that the explanation will be simplified by giving the same signs to same parts of the embodiment as those mentioned above.

With regard to the bearing device 30 in the embodiment shown in FIGS. 8 to 9, an explanation will be provided based on a bearing device 30j as an example, and the explanation is also applicable to other bearing devices 30a to 30i, and 30k.

Figure 11:
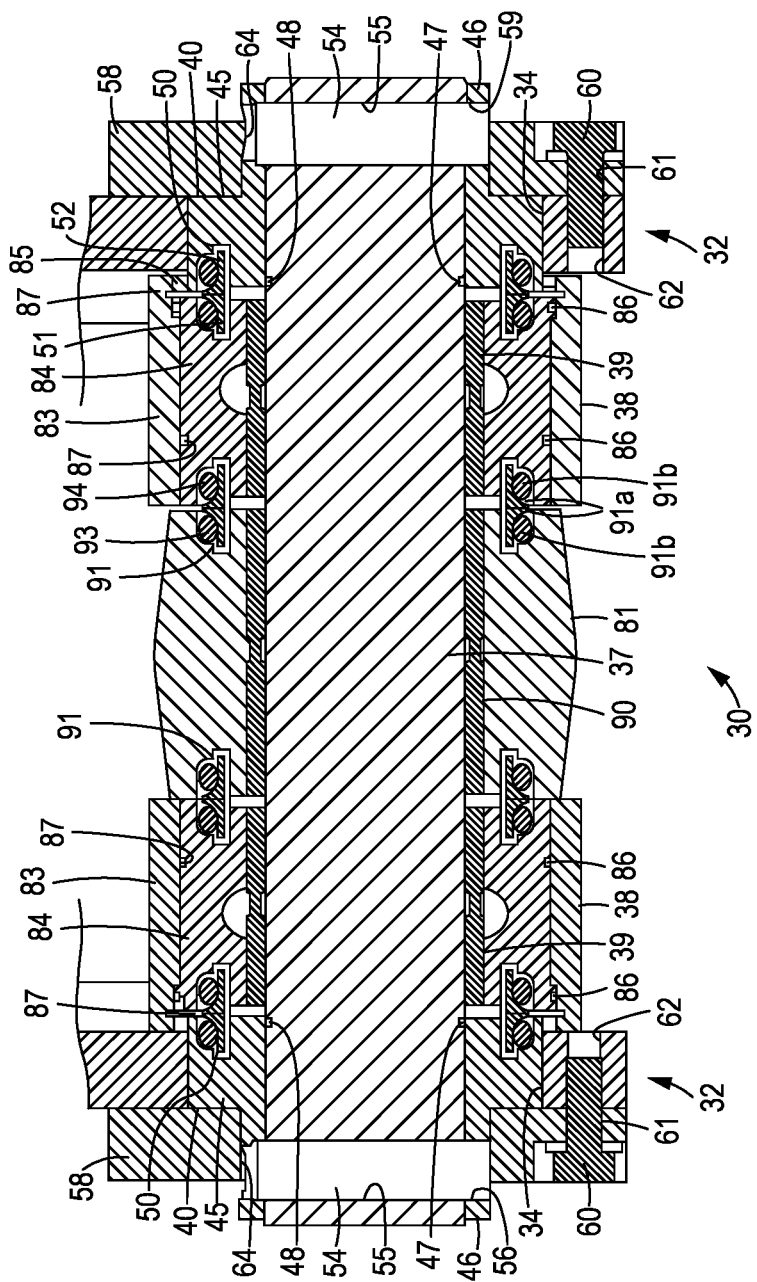
FIG. 11 is a sectional view illustrating a fourth embodiment of the bearing device according to the present invention.
Figure 12A:
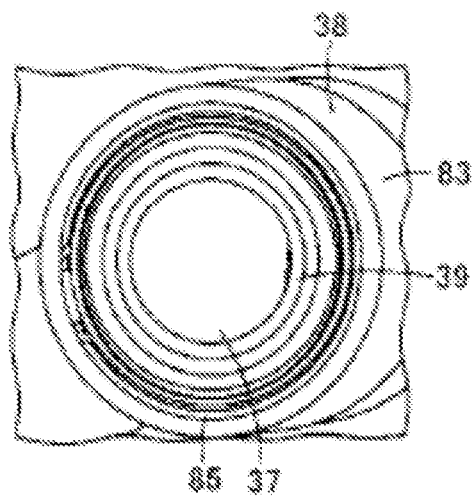
FIG. 12A is a perspective sectional view illustrating one end side of the cylinder part of the bearing device shown above and FIG. 12B is a perspective sectional view illustrating the other end side of the cylinder part of the bearing device shown above.
Figure 12B:
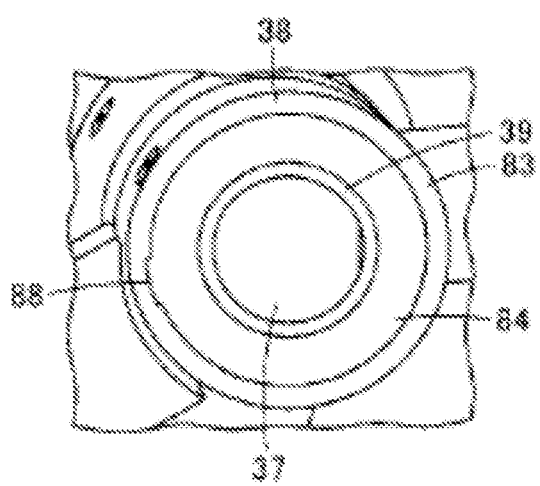
Figure 13:
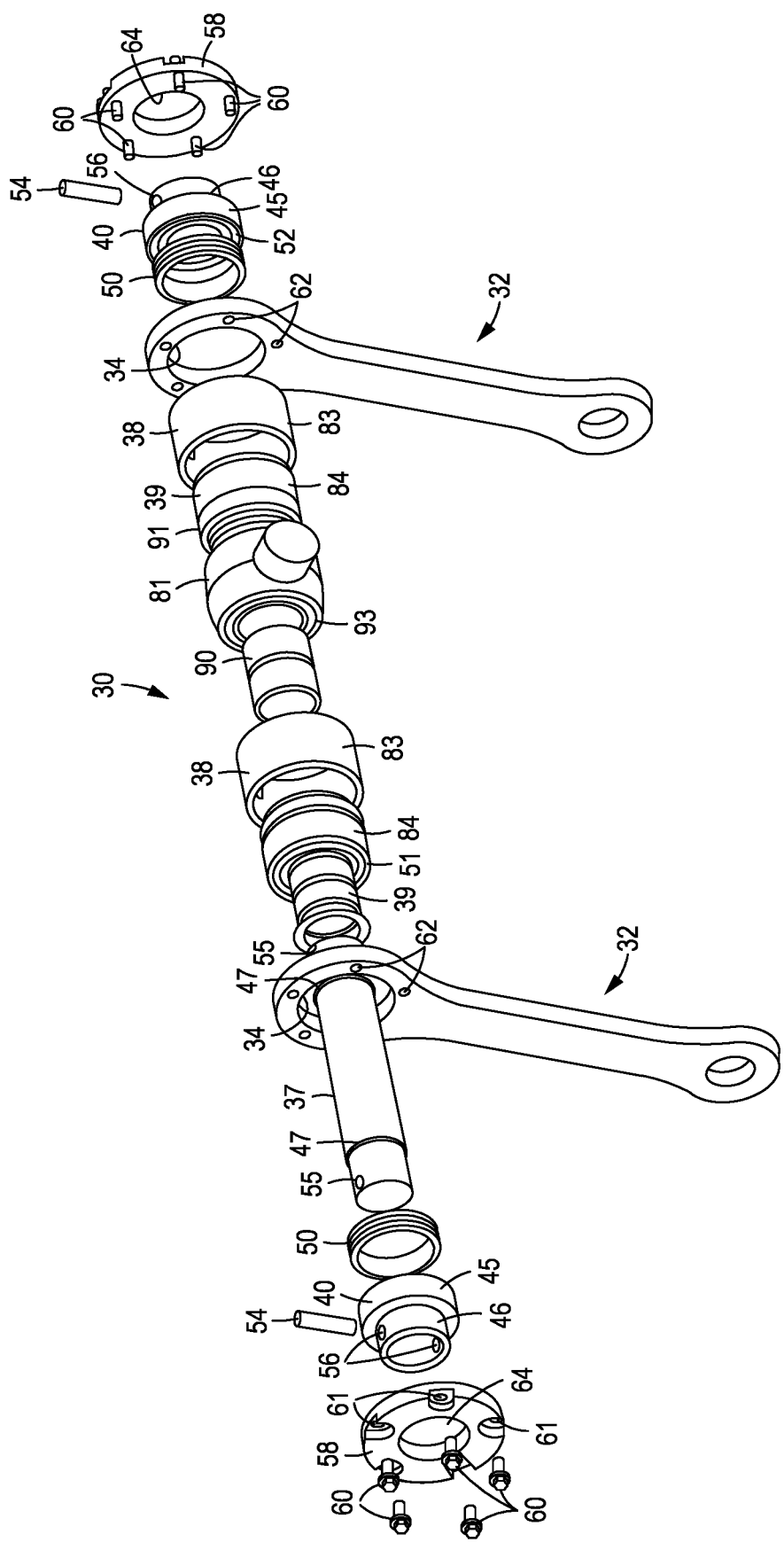
FIG. 13 is a disassembled perspective view illustrating the bearing device shown above.

As shown in FIGS. 11 and 13, between the brackets 32 and 32, the bearing device 30 comprises a pair of the boss portions 38, 38, bearings 39, 39, and an intermediate boss portion 81 as intermediate cylinder part. Each bracket 32 is, in the case of a bearing device 30j, integrally formed respectively at an end part of one link plate of the linkage 28. Each boss portion 38 is also, in the case of the bearing device 30j, integrally formed respectively at an end part of the other link plate of the linkage 28. Furthermore, an intermediate boss portion 81 is, in the case of the bearing device 30j, integrally formed at a tip of a cylinder rod of the bucket cylinder 27.

Also, each boss portion 38 according to this embodiment comprises, for example, a housing 83 holding the bearing 39 and the holding part 84 holding the housing 83. The housing 83 is cylindrically formed, interpolated into the cylindrical holding part 84, and arranged coaxially with the holding part 84. Also, at an end part opposing to the collar 40 of the housing 83, the mounting groove part 51 is formed for mounting the floating seal 50. Furthermore, the housing 83 is retained in axial direction against the holding part 84, for example, by a slip ring 85 as a retaining member (FIG. 12(a)). The slip ring 85 is arranged surrounding an outside of the mounting groove part 51, for example, outside the boss portion 38, i.e. in an end part side opposing to the collar 40. Furthermore, an area between the housing 83 and holding part 84 is sealed respectively by an O-ring 86 as a cylinder part sealing member. The O-ring 86 according to this embodiment is held by a mounting concaved part 87 formed circumferentially on outer peripheral surface of the housing 83 and is pressure-contacted with inner peripheral surface of the holding part 84. Additionally, an idling prevention part 88 is formed on at least either of the housing 83 and the holding part 84 for preventing idling of one against the other (FIG. 12(b)). The idling prevention part 88 according to this embodiment is formed, for example, key-like.

Furthermore, the intermediate boss portion 81 is sandwiched by the boss portions 38 and 38. The intermediate boss portion 81 comprises an intermediate bearing 90 rotatably holding the shaft 37. The intermediate bearing 90 is interpolated into the intermediate boss portion 81 and is coaxially and integrally arranged on the intermediate boss portion 81. Also, the intermediate bearing 90 is lubricated with lubricant oil. The intermediate bearing 90 lets the intermediate boss portion 81 be rotatable against the shaft 37. Also, the intermediate bearing 90 is arranged around both ends of the intermediate boss portion 81. Then, an intermediate floating seal 91 as an intermediate seal member for sealing lubricant oil is sandwiched between the intermediate boss portion 81 and each boss portion 38 and a gap between the intermediate boss portion 81 and boss portion 38 is blocked by the intermediate floating seal 91.

The intermediate floating seal 91 is to prevent oil put in the bearing 39 and intermediate bearing 90 from leaking. The intermediate floating seal 91 has a same constitution as the floating seal 50 and comprises a pair of metal seal rings 91a, for example, as metallic holding rings and a pair of O-rings 91b, for example, as resin rings held on outer peripheral side of this metal seal ring 91a. Then, with respect to this intermediate floating seal 91, one end side (inner) is held by a groove part 93 formed around the intermediate bearing 90 at the end part of the boss portion 38 side of the intermediate boss portion 81, and the other end side (outer) is held by a groove part 94 formed around the bearing 39 at an end part of the intermediate boss portion 81 side of the boss portion 38. In this embodiment, the groove part 94 is formed at the housing 83 of each boss portion 38. Note that the end parts of each boss portion 38 and each collar 40 both sandwiching the floating seal 50 and the end parts of each boss portion 38 and the intermediate boss portion 81 both sandwiching the intermediate floating seal 91 may form the same labyrinth route as that in the third embodiment.

Then, with respect to the bearing device 30, the shaft 37 and the collars 40, 40 are integrally fixed by the pins 54, 54, and these integrally fixed shaft 37 and collars 40, 40 are integrally fixed on the brackets 32, 32 by the flanges 58, 58. Therefore, the boss portions 38, 38 rotatably holding the shaft 37 with the bearings 39, 39 and the intermediate boss portion 81 being sandwiched by these boss portions 38, 38 and rotatably holding the shaft 37 with intermediate bearing 90 become relatively rotatable respectively independently against the shaft 37, collars 40, 40, and brackets 32, 32. Here, the floating seal 50 keeps the sealing performance in the space having the bearings 39, 39 while one metal seal ring 50a slide-contacts with and relatively rotates against the other metal seal ring 50a. Similarly, the intermediate floating seal 91 keeps the sealing performance in a space having the intermediate bearing 90 while one metal seal ring 91a slide-contacts with and relatively rotates against the other metal seal ring 91a.

According to this embodiment, by sandwiching the intermediate boss portion 81 between a pair of boss portions 38 and 38, lubricant oil can be also surely sealed at opposite side of the collar 40 of each boss portion 38. Furthermore, by sandwiching the intermediate floating seal 91 between the boss portion 38 and intermediate boss portion 81 and by integrally fixing each collar 40 on the shaft 37 by using the pin 54, the predetermined axial load can also be applied to the intermediate floating seal 91, and the intermediate floating seal 91 is prevented from being opened so that the sealing performance in space having an intermediate bearing 90 in the intermediate boss portion 81 can be ensured with the intermediate floating seal 91. Therefore, it is also unnecessary to feed lubricant oil to the intermediate bearing 90 over a long term.

In addition, in each embodiment mentioned above, a pair of the brackets 32 were formed, but it can be configured to form only one with a predetermined thickness.

The structure mentioned above sandwiching the floating seal 50 with the boss portion 38 and collar 40 may be formed only at one end side of the shaft 37.

INDUSTRIAL APPLICABILITY

The present invention can provide industrial applicability to businesses who manufacture or sale various bearing devices to be used in, for example, the work device of construction machine and construction machine equipped with this bearing device.

The invention claimed is:
1. A bearing device comprising:
a shaft body;
a first cylinder part having bearings rotatably holding the shaft body;
a first cylindrical holding member mounted on a first end part side of the shaft body rather than the first cylinder part;

a first seal member for sealing lubricant sandwiched between the first cylinder part and the first holding member;

a first pin being inserted into holes provided in the shaft body and the first holding member and integrally fixing the first holding member at a position where a predetermined axial load is applied to the first seal member between the first holding member and first cylinder part;

a first mounted part having an opening for mounting the first holding member; and a first fixing means for fixing the first holding member on the first mounted part, wherein the first fixing means is mounted on the first holding member and retains the first pin.

2. The bearing device of claim 1, comprising a second holding member mounted on a second end part side of the shaft body opposite the first end part side.

3. The bearing device of claim 2, comprising:
a second cylinder part; and
an intermediate cylinder part sandwiched between first cylinder part and the second cylinder part.

4. The bearing device of claim 3,
wherein the intermediate cylinder part has an intermediate bearing rotatably holding the shaft body, and
wherein the bearing device comprises an intermediate seal member for sealing lubricant sandwiched between the first cylinder part and intermediate cylinder part.

5. The bearing device of claim 1,
comprising an inner seal member for sealing a contact area between the shaft body and the first holding member.

6. The bearing device of claim 1,
wherein end parts of the first cylinder part and first holding member both sandwiching the first seal member are formed partially overlapping with each other in an axial direction of the shaft body.

7. The bearing device of claim 1,
wherein the mounted part comprises a reinforced plate around the opening.

8. A construction machine comprising the bearing device of claim 1.

9. A bearing device comprising:
a shaft body;
a cylinder part having bearings rotatably holding the shaft body;
a cylindrical holding member mounted on an end part side of the shaft body rather than the cylinder part;
a seal member for sealing lubricant sandwiched between the cylinder part and the holding member;
a pin being inserted into holes provided in the shaft body and the holding member and integrally fixing the holding member at a position where a predetermined axial load is applied to the seal member between the holding member and cylinder part;
a mounted part having an opening for mounting the holding member; and
a fixing means for fixing the holding member on the mounted part, wherein the mounted part has a concaved part into which the fixing means is fitted.

10. A bearing device comprising:
a shaft;
a first boss on the shaft proximate a first end of the shaft and having a first bearing rotatably holding the shaft;
a first collar mounted on the first end of the shaft outward from the first boss;
a first floating seal for sealing lubricant sandwiched between the first boss and the first collar;
a first pin being inserted into holes provided in the shaft proximate the first end of the shaft and the first collar and integrally fixing the first collar at a position where a predetermined axial load is applied to the first floating seal by the first collar and first boss;
a first bracket having an opening for mounting the first collar; and
a first flange for fixing the first collar on the first bracket, wherein the first flange is mounted on the first collar and retains the first pin.

11. The bearing device of claim 10, comprising a second collar mounted on a second end of the shaft opposite the first end of the shaft.

12. The bearing device of claim 11, comprising:
a second boss; and
an intermediate boss sandwiched between the first boss and the second boss.

13. The bearing device of claim 12, wherein the intermediate boss has an intermediate bearing rotatably holding the shaft, and wherein the bearing device comprises an intermediate floating seal for sealing lubricant sandwiched between the first boss and intermediate boss.

14. The bearing device of claim 1, wherein a mounting groove part of the first boss and a holding groove part of the first collar sandwiching the first floating seal member are formed partially overlapping with each other in an axial direction of the shaft.

15. A construction machine comprising the bearing device of claim 10.

* * * * *